United States Patent [19]

Schwarz

[11] Patent Number: 4,471,938

[45] Date of Patent: Sep. 18, 1984

[54] MODULATING POPPET VALVE

[75] Inventor: Frederick M. Schwarz, Glastonbury, Conn.

[73] Assignee: United Technologies Corporation, Hartford, Conn.

[21] Appl. No.: 438,114

[22] Filed: Nov. 1, 1982

[51] Int. Cl.³ ............................................. F16K 31/122
[52] U.S. Cl. ........................................ 251/25; 91/402; 91/416; 251/63.6
[58] Field of Search .................... 91/402, 416; 251/25, 251/63.6

[56] References Cited

U.S. PATENT DOCUMENTS

| | | | |
|---|---|---|---|
| 1,347,276 | 7/1920 | Johnson | 91/402 |
| 1,818,910 | 8/1931 | Sanine | 91/402 |
| 2,117,595 | 5/1938 | Baule | 91/402 |
| 2,232,514 | 2/1941 | Day | 91/402 |
| 3,527,141 | 9/1970 | Peoples | 91/402 |
| 3,531,065 | 9/1970 | Brown | 91/402 |
| 3,542,332 | 11/1970 | Chevalier et al. | 251/63.6 |

FOREIGN PATENT DOCUMENTS

| | | | |
|---|---|---|---|
| 46724 | 3/1982 | Fed. Rep. of Germany | 91/402 |
| 103911 | 6/1982 | Japan | 91/402 |

Primary Examiner—George L. Walton
Attorney, Agent, or Firm—Norman Friedland

[57] ABSTRACT

A poppet valve movable to discrete opened positions by metering fluid through axially spaced orifices in a cylinder by a piston directly connected to the poppet. The flow of fluid through the orifice is interrupted to cause the piston to translate to the next adjacent orifice.

3 Claims, 2 Drawing Figures

MODULATING POPPET VALVE

TECHNICAL FIELD

This invention relates to valve means and more particularly to a valve having more than one discrete position for each input command signal.

BACKGROUND ART

This invention has particular utility in an active clearance control system of the type exemplified by U.S. Pat. No. 4,069,662 granted to Redinger et al on Jan. 24, 1978 and assigned to the same assignee as this patent application. As disclosed in that U.S. Patent, air from a source, such as the fan discharge air, is fed to a plurality of spray bars that direct the air to impinge air on the exterior of the engine case in proximity to the turbine. This serves to shrink the case at a predetermined time relative to the engine's flight envelope for the purpose of maintaining a close gap between the outer periphery of the turbine buckets and its associated outer air seal that surrounds the same.

The clearance control system currently being employed utilizes an on-off type of valve. I have found that I can replace these existing valves with my invention, obtain flow modulation and yet achieve a highly reliable valve that is characterized as being relatively simple. In accordance with my invention the valve is opened to some discrete position in response to a control input command signal. Each discrete position can be tailored to give a given amount of airflow for any given application without incurring any complicated redesign or major changes in the valve structure.

DISCLOSURE OF INVENTION

An object of this invention is to provide for a clearance control system that impinges air on the engine case an improved modulating valve. The valve has discrete open positions for each given control signal and is characterized as being relatively simple, highly reliable, and replaces existing on/off type of valves currently being utilized in clearance control systems.

Other features and advantages will be apparent from the specification and claims and from the accompanying drawing which illustrates an embodiment of the invention.

BEST MODE FOR CARRYING OUT THE INVENTION

While the invention is intended for use in its preferred embodiment in an active clearance control system for a fan-jet engine as will be evidenced from the description presented herein, the invention has utility in other environments.

Figure 1:
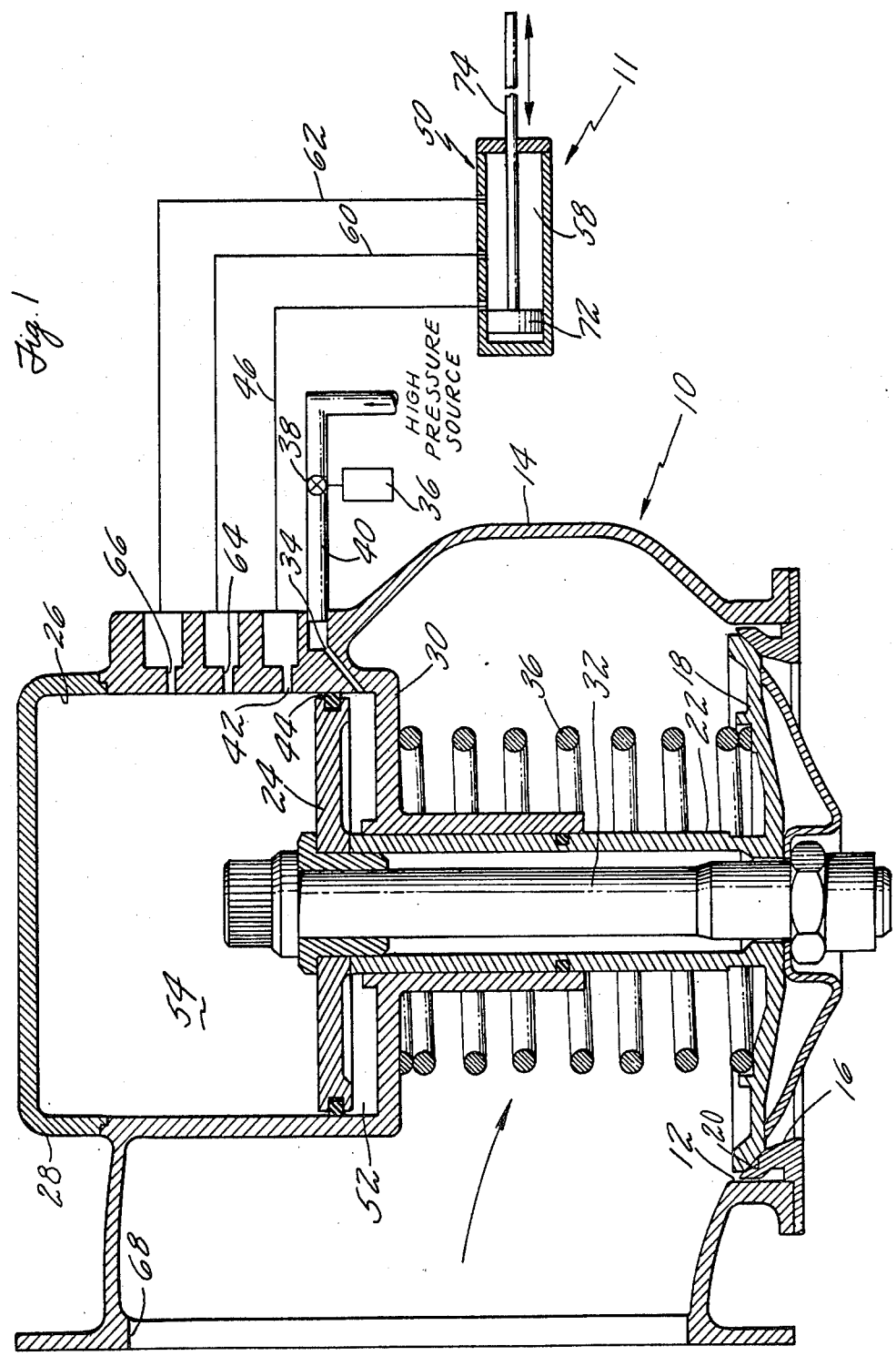
FIG. 1 is a view partly in section and partly in schematic showing the details of this invention.
Figure 2:
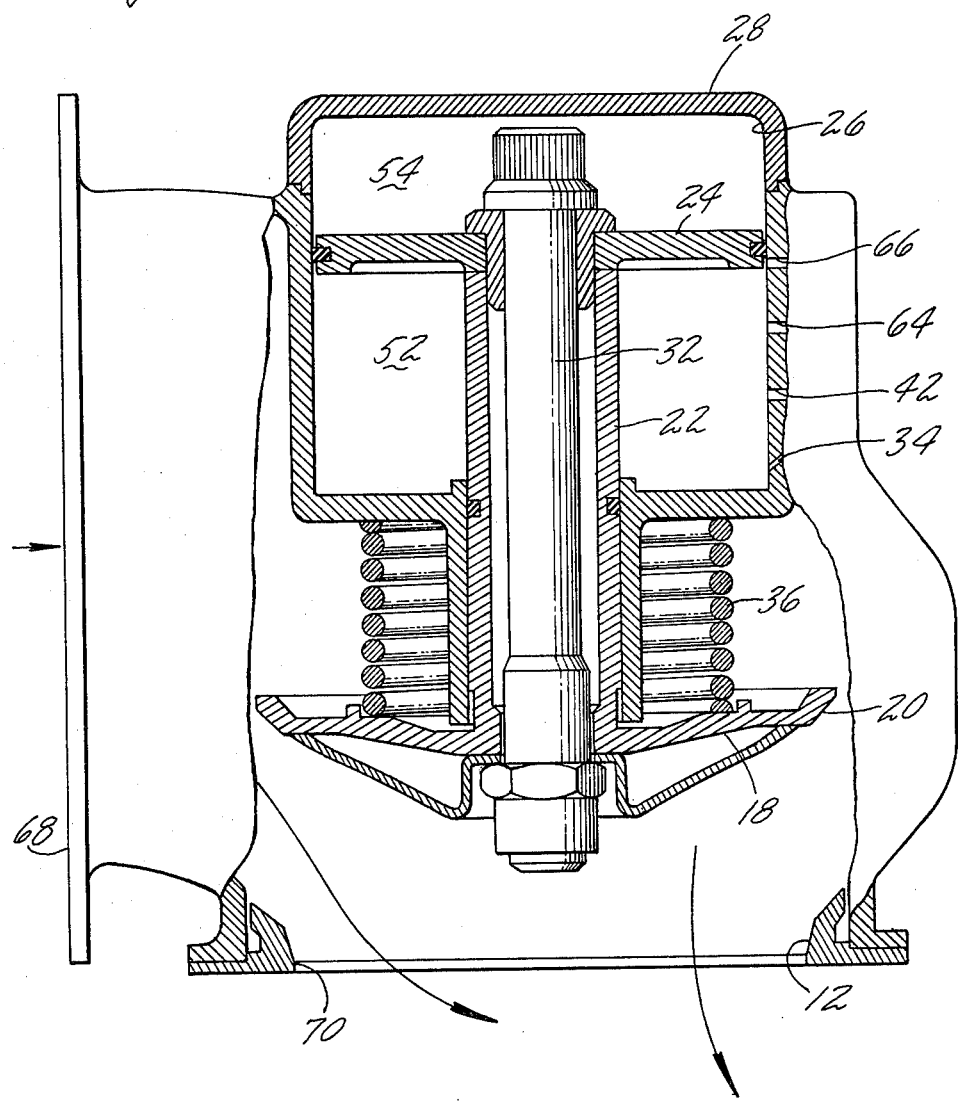
FIG. 2 is a view of the valve in FIG. 1 in the deployed position.

Referring to FIGS. 1 and 2, the invention comprises a poppet type valve generally indicated by reference numeral 10 and suitable means for effectuating control thereof generally indicated by reference numeral 11. For each given command input signal the poppet is opened to corresponding discrete positions. As noted from the Figs., the valve body comprises a generally circular opening 12 defined by the valve casing 14 supporting the circular seating element 16. The poppet valve element 18 carries a beveled seating surface 20 that seats against a complimentary face defined by the seat 16. The sleeve 22 extending through the center of the valve body is fixedly secured to the piston 24 extending in the cylinder 26 defined by the casing 14 and having a bottom and top closure portion 28 and 30, respectively.

As is apparent from the foregoing, the poppet element 18, sleeve 2 and the rod 32, fixedly securing piston 24 and poppet 18, are rigidly supported to move together. The poppet 18 is biased in a closed position by coil spring 36 and is opposed by servo pressure fluid (air or liquid) that is admitted into the cylinder 26 through port 34 to act on the underside of piston 24. Actuating solenoid 36 (disclosed as the blank box) opens valve 38 to admit servo pressure from a high pressure source through conduit 40, which may be in this instance be pressure from the compressor section of the engine. This causes the piston 24 to translate upwardly until it uncovers port 42. The seal 44 of piston 24 will travel until it passes the upper edge of port 42 where it will connect line 46 to the spool valve 50. This will interconnect the underneath portion 52 of cylinder 26 (under piston 24) to the upper portion 54 of cylinder 26 (above piston 24). In its preferred embodiment, the flow from chamber 52 flows from port 42 through line 46 through the passageway 58 in spool valve 50 and back to chamber 54 through lines 60 and 62 and ports 64 and 66 respectively. It is expected that a certain amount of leakage occurs and that the pressure will balance the piston 24 in the discrete opened positions.

Obviously, in the opened position of poppet 18 as shown in FIG. 2 (full open) the air from the source in the active clearance control will be admitted into inlet opening 68 and pass through the valve seat 16 to the outlet opening 70.

As the valve spool 72 is caused to translate rightwardly upon actuation of the actuation rod 74 positioned by any command signal that may be desired, it dead-ends the flow from line 46. In the active clearance control embodiment, any relevant engine parameter, say compressor discharge air temperature, would preferably be utilized. This allows piston 24 to move further upwardly until port 64 is uncovered to communicate with chamber 52. Hence, the underneath portion of piston 24 will communicate with chamber 54 through port 64, line 60, passageway 58, line 62 and port 66.

Further positioning of spool 72 to dead-end the flow from line 60 allows piston 24 to travel to uncover port 66 which will be the full opened position of poppet 18.

While the preferred embodiment returns the servo pressure underneath piston 24 back to the cylinder 26, above piston 24, this is not necessary for the operation of the valve. This serves to conserve on servo pressure and introduce a certain amount of dampening but, in small valves where servo pressure is not at a premium or dampening is unnecessary, this feature may be eliminated.

The location of the piston relative to each port will determine the amount of travel of the piston which determines the opening of the poppet. It would be relatively easy to change the stroke by adjusting the position of the piston. For example, adding shims moves the piston closer to port 42 for reduced valve opening of the first discrete opened position of the valve.

It should be understood that the invention is not limited to the particular embodiments shown and described herein, but that various changes and modifications may be made without departing from the spirit and scope of this novel concept as defined by the following claims.

I claim:

1. A valve having a generally hollow valve body including a generally circular shaped outlet opening formed on one end for flowing fluid admitted thereto from an inlet opening formed on another portion of said valve body, a circular seat surrounding said outlet opening, a valve stem extending through said hollow body centrally from said seat into an axially spaced hollow cylindrical cavity defined by a cylindrical wall having closure means on the bottom and top thereof for defining a cylinder, a poppet valve element having a complimentary seating surface to said circular seat on one end of said valve stem retractably engaging said seat and a piston in said cylinder attached to said valve stem on the one remote from said poppet valve element, said piston having sufficient clearance in said cylinder permitting fluid to flow from one side to the other side thereof, a plurality of axially spaced openings in said cylinder located relative to the position of said piston and being in successive metering relationship therewith, means for applying a pressure to the underside of said piston for urging the piston in the direction of said plurality of said axially spaced openings, selective means for controlling said pressure applying means to position said piston to uncover the first of said plurality of axially spaced openings to communicate said opening with said pressure on the underside of said piston through the selective means such that the pressure will be received above said piston for balancing the pressure underneath said piston to hold said piston in the metering position with said first opening, said selective means interrupts the flow of fluid from said first of said plurality of axially spaced openings for allowing said piston to move to the next adjacent of said plurality of axially spaced openings to communicate it with the underside of said piston so that the piston is metering said adjacent opening with the pressure underneath the piston and through the selective means so that the pressure will be received above said piston for balancing the pressure underneath said piston whereby the valve poppet element is selectively moved to successive discrete open positions for modulating the flow of fluid from said inlet to said outlet.

2. A valve as in claim 1 including a spring on the underside of said piston for biasing said piston in the same direction as the fluid acting on the underside of said piston.

3. A valve as in claim 2 including a control valve including a movable land, connection means interconnecting said plurality of axially spaced openings and corresponding axially spaced openings in said control valve, said land being rectilinearly positioned to interrupt the flow of fluid that interconnects said cylinder above said piston in the valve poppet element seated position and successively connected to dead-end said connection upon a command signal actuating said land rectilinearly.

* * * * *

UNITED STATES PATENT AND TRADEMARK OFFICE
CERTIFICATE OF CORRECTION

PATENT NO. : 4,471,938
DATED     : September 18, 1984
INVENTOR(S) : Frederick M. Schwarz It is certified that error appears in the above-identified patent and that said Letters Patent is hereby corrected as shown below:

Column 3, line 20 "one" should be --end--.

Signed and Sealed this

Seventh Day of May 1985

[SEAL]

Attest:

DONALD J. QUIGG

Attesting Officer    Acting Commissioner of Patents and Trademarks